United States Patent

[11] 3,591,731

[72] Inventor William V. Stancil
Hollywood, Calif.
[21] Appl. No. 761,712
[22] Filed Sept. 23, 1968
[45] Patented July 6, 1971
[73] Assignee Leigh Products, Inc.
Coppersville, Mich.

[54] METHOD AND APPARATUS FOR RECORDING REAL TIME SUPERIMPOSED ON OTHER INFORMATION
19 Claims, 5 Drawing Figs.

[52] U.S. Cl. .......... 179/100.2
Md, 340/174.1 A
[51] Int. Cl. .......... G11b 27/10
[50] Field of Search .......... 179/100.2
S, 100.2; 318/20.102, 20.135; 340/174.1 A

[56] References Cited
UNITED STATES PATENTS

| | | | |
|---|---|---|---|
| 2,475,245 | 7/1949 | Leaver et al. | 318/162 |
| 2,537,770 | 1/1951 | Livingston et al. | 318/162 |
| 2,698,410 | 12/1954 | Madsen et al. | 318/162 |
| 2,755,422 | 7/1956 | Livingston | 179/100.2 |
| 2,822,722 | 2/1958 | Kennedy | 179/100.2 |
| 3,304,377 | 2/1967 | Kietz et al. | 179/100.2 |

FOREIGN PATENTS

| | | | |
|---|---|---|---|
| 763,341 | 12/1956 | Great Britain | 179/100.2 MD |

*Primary Examiner*—Bernard Konick
*Assistant Examiner*—Robert S. Tupper
*Attorney*—Christie, Parker & Hale

ABSTRACT: A method and apparatus for recording real time information simultaneously with other information signals to be recorded. The system utilizes one or more self-synchronous "generators" (record synchros) with a recording apparatus to generate real time signals which are recorded on a recording medium together with primary information signals to be recorded. A corresponding number of self-synchronous "motors" (reproduce synchros) are utilized with a playback apparatus to "read" the previously recorded real time information and to reproduce this information by driving a time display device associated with the playback apparatus. The primary information signals and the real time signals are recorded in different frequency bands with suitable dividing networks being provided with the record and playback mechanisms.

INVENTOR.
WILLIAM V. STANCIL
BY
Christie, Parker & Hale
ATTORNEYS

INVENTOR.
WILLIAM V. STANCIL
BY
Christie, Parker & Hale
ATTORNEYS

METHOD AND APPARATUS FOR RECORDING REAL TIME SUPERIMPOSED ON OTHER INFORMATION

BACKGROUND OF THE INVENTION

The prevent invention relates to a method and apparatus for recording motion and in particular a method and apparatus for recording real time information, e.g., as represented by the motion of a clock movement, simultaneously with other information to be recorded.

Magnetic recording is now widely used to record information and there are many recording situations where a time reference, for example, the exact time of day when the recording was made, is highly desirable. One example is in a public safety dispatch center using radio communications to control personnel and vehicles for emergency operations. In order to satisfy legal requirements, it is often essential that highly precise records as to the time when specific actions took place be available. In such dispatch centers it is now a fairly standard practice that all voice and signal communications are recorded at the same time that they are transmitted to or received from a remote location.

However, because such communications frequently occur under emergency conditions it is quite difficult and frequently distracting to accurately log the time of day of the communication at the beginning and end of each dispatch. One approach to satisfy the need for providing time information has been to record programmed oral time notations as they are reproduced from an auxiliary tape or a telephone company time service or by a digital coding scheme recorded along with the operator's communication. Such systems are often quite critical in operation and subject to failure as well as requiring one or more separate channels of the recording system for recording the time information. In addition it is sometimes difficult to correlate the time announcements along with the reproduced messages under study.

In telemetry and other applications it is frequently desirable to be able to provide time reference information together with information signals which are being transmitted or recorded. In many instances time information is provided by means of a pulse generator which produces a series of clock pulses which are multiplexed with the information signals before transmission or recording. A disadvantage of such systems is that the only reference points in such time signals are the beginning and end of transmission. Thus, where an incremental portion of a telemetry signal is examined, it is difficult and usually impossible to determine from that portion alone the actual instant in a second, minute, hour, etc. frame of time reference when the signal was generated.

SUMMARY OF THE INVENTION

The present invention provides a time recording system which can be used to simultaneously record real time information at the same time other intelligence information is being recorded. Depending on the number of tracks or channels available in the recording medium, the actual second, minute, hour, day, week, etc. that a particular event occurred can be recorded and recovered from even the smallest increment of tape without reference to the beginning or end of the recorded sequence.

In terms of apparatus the invention contemplates the provision of a source of intelligence information to be recorded and a source of reference information to be recorded. An electric signal source having a plurality of outputs is operatively linked to the source of reference information for generating a signal at each output, the combination of said signals being an electric counterpart of the reference information from the reference information source. A recording medium having a plurality of recording channels is provided together with a plurality of recording transducers, each transducer being located in operative recording relationship with a different channel of the recording medium and being connected to receive a different one of the output signals from the signal source. At least one of the recording transducers is connected in common to the source of intelligence information and to the electric signal source and means are provided for moving the recording medium relative to the transducers to record the intelligence and reference information simultaneously in the plurality of recording channels.

In terms of method the invention contemplates the method of recording reference information with intelligence information by the steps of providing a plurality of recording transducers and locating a recording medium having a plurality of recording channels in an operative recording relation with the transducers, each of the transducers being located in an operative recording relation with a different channel of the recording medium. Signals corresponding to the intelligence information to be recorded are transmitted to at least one of the transducers and a plurality of related reference signals are generated responsive to a source of the reference information to be recorded, the combination of said reference signals being an electric counterpart of the reference information to be recorded. Each of the plurality of reference signals is transmitted to one of the plurality of transducers. The intelligence information signals and a first one of the related reference signals are recorded simultaneously by means of a first one of the plurality of transducers in a first channel of the medium while a second one of the plurality of related reference signals is recorded by means of a second one of the plurality of transducers in a second channel of the medium.

Applying the apparatus of the present invention to a situation where real time information is to be recorded simultaneously with other information, the present invention provides a method and apparatus for obtaining continuous real time recording without requiring any additional recording medium channels. Such a result is accomplished by providing time information in a frequency range outside the frequency range of the intelligence information to be recorded but within the recording frequency range of the recording apparatus so that the two forms of information can be recorded in the same channel. By virtue of the unique method of generating the time information, it is possible to obtain self-referencing reproduction of recorded time from the shortest segment of tape or other recording medium. Further, a secure and tamperproof voice recording is obtained, one which would be most difficult to alter at a later date without detection. Finally, since the recording medium is continuously coded with respect to time, any section thereof may be searched and located by automatic means.

In a presently preferred embodiment of the invention synchros, i.e., self-synchronous generators and motors, more commonly known by their trade names Selsyns, Teletorques and Autosyns, are utilized to provide the time reference information. A synchro system can be provided with two or three pairs of output coils. Either is possible in the present invention and in the preferred embodiment a three coil system is utilized. The synchro provides an armature or rotor with connections made thereto through slip rings and a stator carrying the three output coils or windings. An AC voltage of a particular frequency is applied to the rotor causing a current and a magnetic flux in the rotor. The flux induces voltages in the stator windings; the magnitude of the voltages induced in each stator winding depending upon the particular angular position of the rotor. The voltages across each of the three stator windings are all in phase but their amplitudes vary with the sine of the angle between the coil axes. For a given set of stator voltages there is only one corresponding rotor position. A synchro will frequently be referred to herein as an electric signal source or as an electric signal generator.

Utilizing this characteristic of synchros, the rotor of a first synchro is connected to a source of motion such as a rotary clock movement. The movement of the clock produces a corresponding movement of the rotor of the synchro causing a voltage to be produced at the output from the synchro stator windings. By recording the output voltages in a suitable recording medium, real time information as to the occurrence of an event can be permanently preserved. By simultaneously recording other intelligence information in a frequency range other than the frequency of the time information, time information as to when a particular recording was made can be obtained.

Because there is only one rotor position corresponding to a set of stator voltages, the rotor of a synchro on the reproduce side of a recording system automatically moves to a position exactly corresponding to the position of the recording synchro rotor. If a clock movement is mechanically linked to the reproduce synchro rotor, the movement is automatically driven to the clock position corresponding to the time when the recording was made. If the clock movement is calibrated in time reference notation, the time of the recording can be instantly determined.

In the preferred embodiment the normal line frequency, i.e., 50 to 60 hertz, used to power the recording and reproduce systems, is utilized to energize the synchros thereby providing time recording at the line frequency. Since voice communications typically fall in a frequency range higher than line frequency, the time and intelligence information can be simultaneously recorded in the same channel of the recording medium without interfering with each other by means of a common recording amplifier providing, where warranted, a dividing network operating on a band-pass principle. Dividing networks or circuits are used on the reproduce side to filter the time information and causes it to be transmitted to the synchros while the intelligence information is transmitted to a suitable transducer such as a magnetic speaker. Depending on the number of synchros provided on the record and reproduce sides, extensive time reference information can be provided including, if sufficient synchros are used, the second, minute, hour, day, week, and month at which the event is recorded.

Since the foregoing system is essentially a system for recording motion and in the present embodiment for recording the motion of a clock movement, the system is likewise adaptable and applicable to systems of recording other types of motion, for example, handwriting, meter displays, and graphical displays such as those of X—Y plotters.

DESCRIPTION OF THE FIGURES

The foregoing features and advantages of the apparatus will be better understood by reference to the following figures in which.

DESCRIPTION OF SPECIFIC EMBODIMENTS

Figure 1:
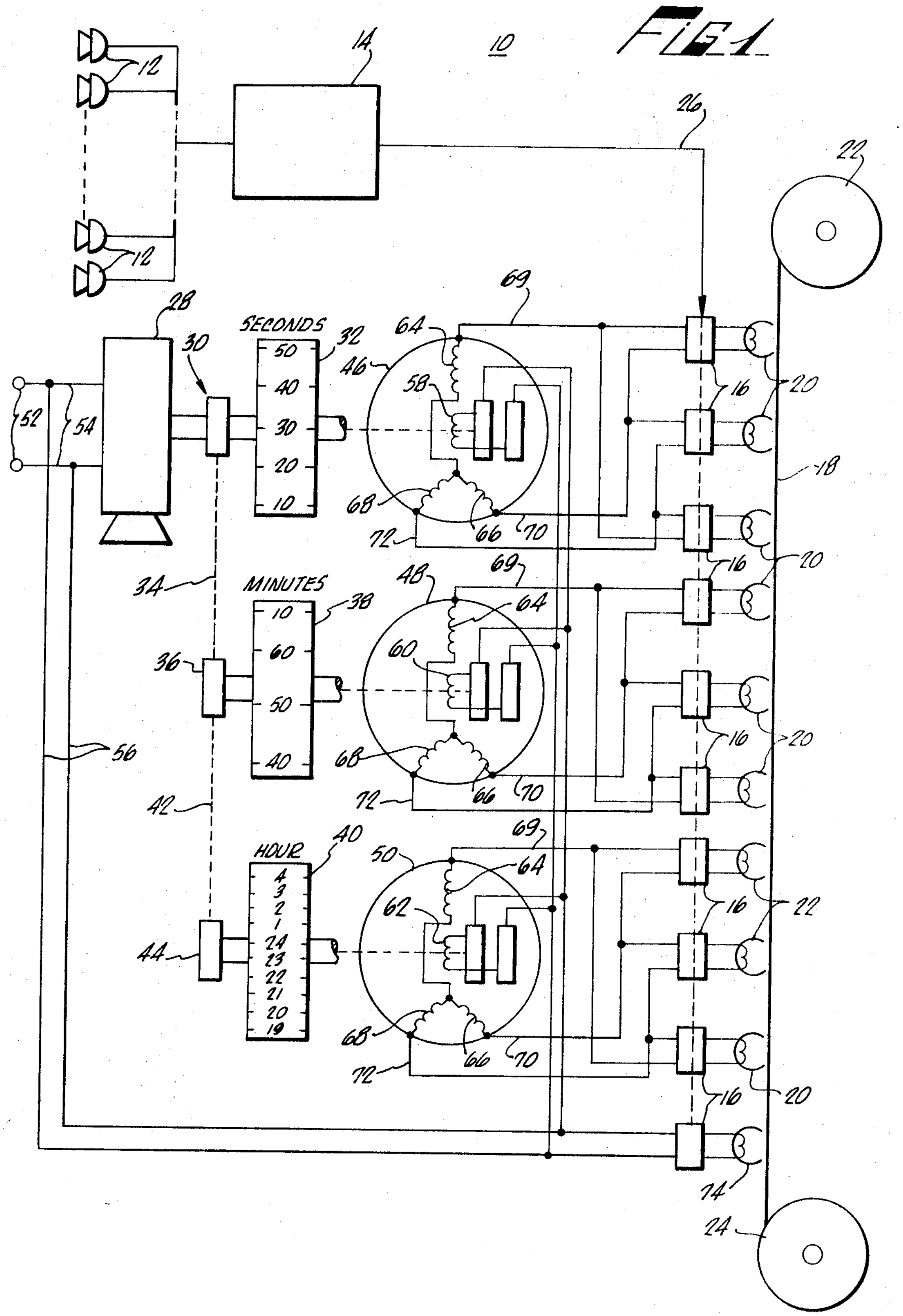
FIG. 1 is a schematic block diagram illustrating the record side of a combined real time and intelligence information recording system.

In FIG. 1 is shown an embodiment of the record section of the present invention. In this embodiment a 10 track magnetic recording system is contemplated. The record section comprises at least one audio or transducer 12, such as a microphone, which is electrically connected to conventional circuitry 14 containing the electronics for conditioning the audio input signals for recording, e.g., magnetic recording. Four transducers 12 are shown in FIG. 1 and are representative of the number of such transducers up to 10 which can be utilized with the 10 track magnetic tape used in this embodiment of the invention to record up to 10 separate tracks of intelligence information, e.g., voice communications in the 10 track tape. The conditioned signals are transmitted from circuitry 14 to a recording amplifier 16 associated with each separate audio input and each separate recording channel on the recording medium 18. The output of amplifiers 16 are connected to recording transducers such as magnetic recording heads 20 located in a recording relationship with a length of magnetic tape 18 adapted to be driven from a supply reel 22 to a takeup reel 24. The amplifiers 16 which may optionally be provided with crossover or divider networks provide recording bias and prevent interfering signals from circuitry 14 from feeding through the recording amplifier to a source of time reference signals 32 connected to amplifier 16 and to likewise prevent the source of time reference signals from feeding a signal to the magnetic recording electronics 14 and causing interference with the audio signals to be recorded. Only one electrical connection 26 from the magnetic recording electronics to the record amplifiers 16 is shown, this connection being representative of the multiple connections to each of the amplifiers as represented by the dashed line interconnecting each amplifier.

As indicated previously, it is frequently highly desirable to provide the capability of recording real time information simultaneously with the audio information as it is recorded and to do so without the necessity of providing any additional recording channels for the time information. The present invention provides this capability by providing a synchronous motor 28 mechanically linked through linkage 30 to drive a source of rotary motion such as a rotary clock movement 32 which, as shown in FIG. 1, is calibrated in seconds and makes one complete revolution each minute. Mechanically linked by linkage 34 and appropriately geared at gear box 36 is a second rotary movement or drum 38 calibrated in minutes which completes 1 revolution each hour. A third drum 40 is linked to the preceding drums by linkage 42 and gear box 44 and this drum is calibrated in hours and completes 1 revolution each 24 hours.

Each drum is mechanically coupled on a one to one basis to self-synchronous generators (synchros) 46, 48 and 50, respectively. Synchros 46, 48 and 50 are selected to be of such a size as to produce voltages suitable for recording with recording heads 20. The time recording portion of the record section shown in FIG. 1 is energized by connecting a pair of input terminals 52 to a source of conventional AC power. The electric power is transmitted to the record apparatus by interconnections 54 to synchronous motor 28 and by interconnections 56 to the rotors 58, 60 and 62 of synchros 46, 48 and 50, respectively.

As indicated above, the self-synchronous generators are provided with at least two and, in the embodiment of FIG. 1, three field coils 64, 66 and 68. As the rotor, for example, rotor 58 of synchro 46, rotates, a voltage is induced in each of the coils having a certain amplitude determined by the angular position of the rotor with respect to each of the coils. Each output 69, 70 and 72 from the field coils is connected to two of the three recording or bridging amplifiers 16 associated with that synchro generator. The combination of the voltages induced in the three field coils is specifically related to the angular position of rotor 58 and is not duplicated by any other angular position of the rotor in its 360° arc of travel.

For self-referencing purposes the AC line voltage from an energizing power source, normally the 50 to 60 hertz power supplied by commercial power companies, which is connected to the rotor coils of the synchros, is likewise connected to a recording head 74 for recording in one of the channels on the recording medium. The line voltage is continuously recorded in its assigned channel as the recording medium is moved past the recording heads.

Figure 2:
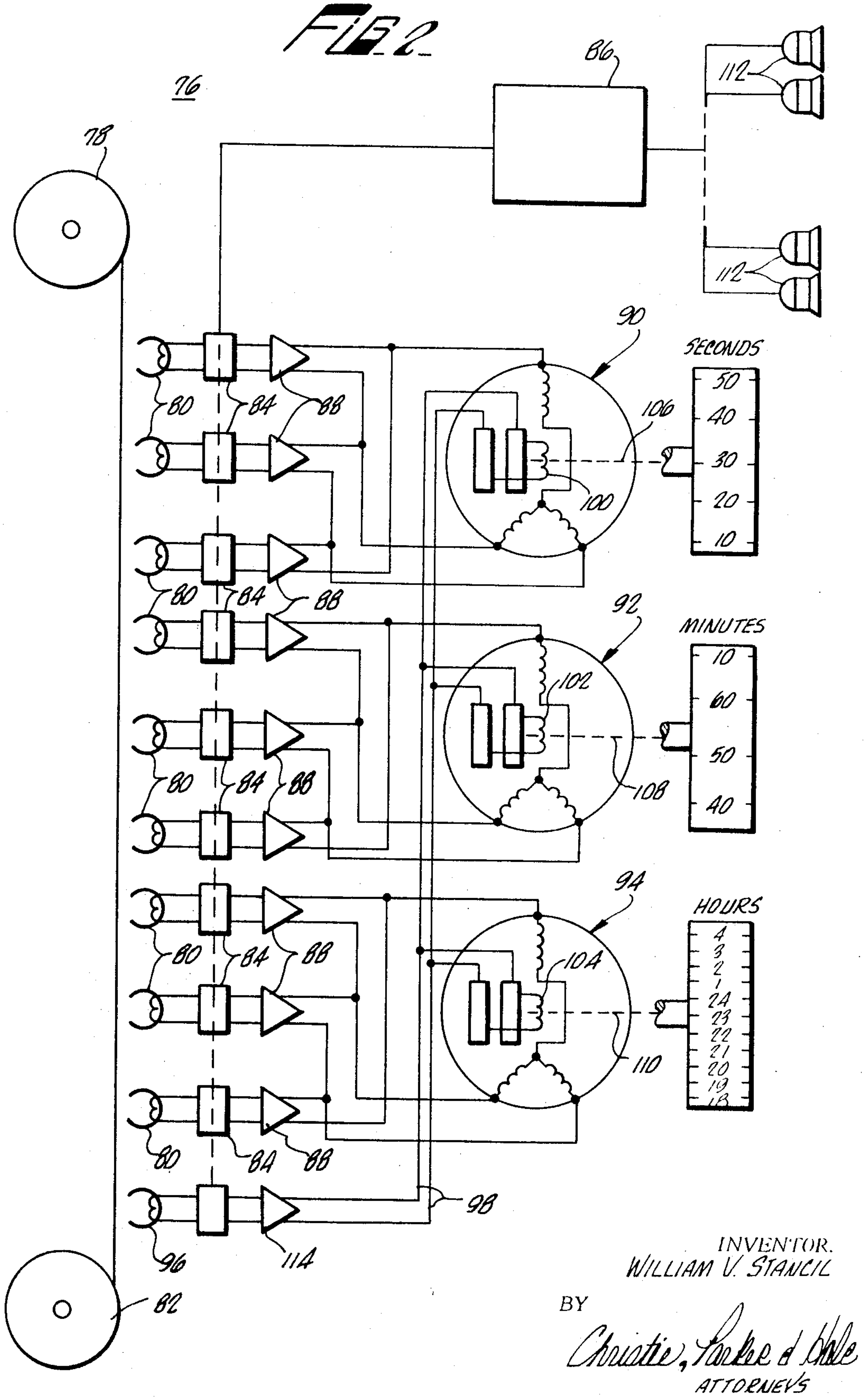
FIG. 2 is a schematic block diagram of the reproduce side of the recording system corresponding to FIG. 1.

The purpose of recording the energizing line voltage in one of the channels of the recording medium is best understood by reference to FIG. 2 which is an illustration of the reproduce or playback section 76 of the apparatus of the present invention. As previously indicated in the embodiment shown in FIGS. 1 and 2, the electrical power from a conventional AC supply applied to the three rotors of the synchro "generators" on the record side is also recorded in a reference channel on the recording medium. This recorded energizing power is reproduced on the reproduce side 76 of the apparatus and is utilized to energize the rotor coils of the synchro "motors" provided in this section of the apparatus. If the energizing power applied to the rotor coils on the reproduce side were not of the same frequency and phase as that applied to the record side there would be phase and frequency differences between the outputs from the various reproduce heads resulting in malfunctioning of the synchros and erroneous time or other reference information indications at the readout device linked to the reproduce synchros.

In operation, audio or other intelligence information in a given frequency range from sources 12 are conditioned by the intervening circuitry and presented to a recording transducer for recording in an assigned channel on the recording medium. An associated synchro output, e.g., the output between stator coils 69 and 70 in a frequency range outside that of the intelligence information, partially representative of reference information such as real time information, is likewise presented to the recording transducer. The combined signals are recorded for later separation and use at a suitably equipped reproducing counterpart to the record apparatus. In the present embodiment only one intelligence information signal and one synchro output are recorded in each recording medium channel. To record all the information produced by the apparatus of FIG. 1 a 10 track medium is used, nine tracks having intelligence and reference information recorded thereon, the tenth having the recorded line voltage. If audio is to be recorded, the typical recording frequency range for the intelligence information is 300 to 3000 hertz and the typical line voltage recording frequency is 60 hertz. Where desired suitable conventional modulation or multiplexing equipment can be provided for receiving and mixing the various combined intelligence and reference information signals with a carrier frequency to enable recording of all signals in a single channel. Likewise, the apparatus and method of the present invention is applicable to situations where the combined intelligence and reference signals are to be transmitted by radio or common carrier lines to a location remote from the place where the signals are generated. As in the recording situation, each combination of signals can by transmitted in its own separate channel, or by means of a modulation scheme, all can be combined for transmission in a single channel. At the remote location the information can be played back immediately or recorded in accordance with the foregoing scheme as the particular situation dictates.

On the reproduce side, as shown in FIG. 2, a recorded tape is extracted from a supply reel 78 and moved past reproduce heads 80 at a constant speed to a takeup reel 82. The combined audio or other intelligence information and the real time information in the form of recorded voltages are reproduced by the reproduce heads and transmitted to suitable filter or dividing networks 84 where the higher frequency audio signal is filtered from the reproduced signal and transmitted to conventional magnetic medium reproducing electronics 86. The lower frequency time information signals are also separated from the reproduced signal and are transmitted to power amplifiers 88 where they are amplified and conditioned for transmission to the synchro "motors" provided on the reproduce side of the apparatus.

The output from the various power amplifiers 88 is connected to three synchro "motors" 90, 92 and 94, respectively, corresponding to the three synchro "generators" on the record side of the apparatus. The electrical connections in this section of the apparatus are similar to that on the record side. Each of the reproduce transducers or heads 80 is connected to a pair of synchro stator or field coils corresponding to the pair of stator or field coils to which corresponding record heads 20 are connnected. The power signal recorded in the tenth track is detected by a reproduce transducer 96 and transmitted in common over electrical connections 98 to the rotor coils 100, 102 and 104 of synchro motors 90, 92 and 94, respectively. As reproduced voltages are transmitted to the various field coils of each of the synchro motors by amplifiers 88, the energized rotor coils are caused to move until the angular displacement of the rotor exactly repeats the original angular position of the rotor of the corresponding synchro in the record section of the apparatus.

A suitable directly connected mechanical linkage 106, 108 and 110 connects each of the reproduce synchros to a display device such as a rotary clock dial and causes the dial to turn until the time at which the recording was made is presented at the display indicator of the clock. Where the clock dials on the record side of the apparatus are calibrated in seconds, minutes and hours, the dials on the reproduce side are similarly calibrated so that as the tape moves from supply reel 78 to takeup reel 82 time information is continually reproduced and transmitted to the field coils of the reproduce synchros causing the rotors to turn and likewise causing the clock dials to turn to indicate the exact second, minute and hour when the recording was made. At the same time the reproduce electronics are transmitting the audio or other intelligence information detected by the reproduce transducers to a plurality of loud speakers or earphones 112, or some other type of information display device, for reproducing the information recorded during the recording interval.

By recording the line voltage used to energize the clock motor 28 and the synchro generators in the record section in one of the channels of the recording medium problems of maintaining absolute tape speed accuracy or identical line frequency and phase relationship for the motor drive system on the reproduce side is eliminated by reproducing the reference line voltage signal from the recording medium rather than from an independent source. The power output of amplifier 114 connected to reproduce head 96 is set to produce sufficient power to energize the rotor coils 100, 102 and 104 of the synchro motors 90, 92 and 94, respectively.

Where modulation or multiplexing apparatus is used on the record side of the apparatus prior to recording or transmission of the combined signals, demodulating equipment of a corresponding type is provided at the reproduce or playback location. A four track recording medium utilizing the present system is likewise applicable, with three of the four tracks being utilized to handle time information along with other intelligence to be recorded while the fourth track is utilized to handle the reference line frequency used on the side of the apparatus with the possibility of recording intelligence information in this channel also, if such a feature is desired.

In the present embodiment, self-synchronous motor having three stator field coils have been described. Synchros of this type are also available in a two stator coil as well as a three stator or output coil version. Where the synchro system utilizes a two output coil arrangement, two tracks on a recording tape are needed. Thus, depending upon the number of tracks available on a magnetic tape, time information can be recorded on a minimum of two tracks and where the line frequency is to be recorded on a minimum of three tracks.

In the preferred embodiment a minimum of four tracks is provided since a three output coil synchro is used with the fourth track used to record the line frequency. As more tracks of the recording medium become available more detailed time information can be recorded. Depending upon the number of tracks available time information such as seconds, minutes, hours, days, weeks, months and years can be provided by providing a suitable number of synchros. In the preferred embodiment, as described previously, it is necessary that one channel be used for recording the line frequency in addition to providing channels for recording the electric signals which are analogs or counterparts of mechanical motion of devices such as the rotary motion of a clock movement or a rotary clock dial.

While any frequency within the range of the recording system could be used to power the self-synchronous generators, it is convenient to use the conventional line frequency which powers the recording equipment. Such frequencies are generally 50 or 60 hertz. This permits recording the frequency separated clock movement voltage signals and the audio or other intelligence information signals on the same recording medium track with suitable provision to prevent interaction of signals, if needed.

Figure 3:
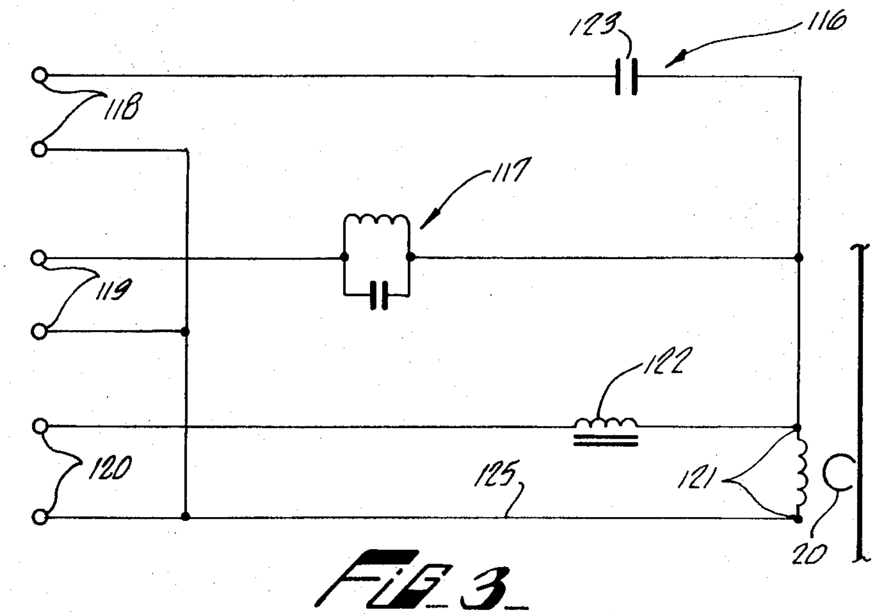
FIG. 3 is a schematic block diagram of one embodiment of a crossover network utilized to record intelligence and time information simultaneously

An example of a network used in conjunction with a recording amplifier is shown in FIG. 3. In that FIG. a network 116 is shown having three pairs of input terminals 118, 119 and 120. The intelligence information such as voice or audio signals in a 300 to 3000 hertz range received from the signal conditioning electronics 14 is connected to terminals 119 through a parallel LC combination 117 and a common lead 125 to terminals 121 to record transducer 20. Similarly, one of the outputs from a synchro is connected to terminals 120 and through a clock 122 and the common lead 125 to terminals 121 of transducer 20 to complete a connection from one of the synchro outputs to the transducer in common with the connection to a source of intelligence information. Recording bias is connected to terminals 118 of network 116 and through capacitor 123 and common lead 125 to terminals 121 of the record transducer.

Figure 4:
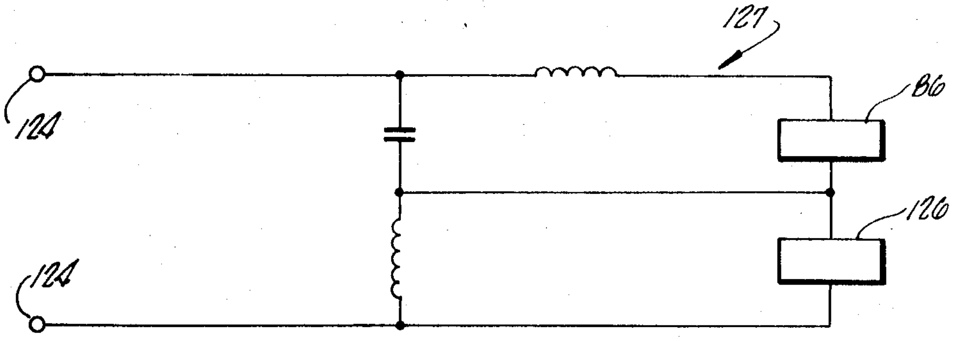
FIG. 4 is a schematic block diagram of a dividing network utilized to reproduce the simultaneously recorded intelligence and time information.

On the output side (FIG. 4) the signal detected by a magnetic reproduce transducer is transmitted to terminals 124 and the high and low frequency components are separated by a filter network 127 with the intelligence information (high frequency signal) being directed to the reproduce electronics section 86 and the real time information (low frequency signal) to module 126 symbolizing the synchro motor and stator windings to which that particular reproduce transducer is connected.

Figure 5:
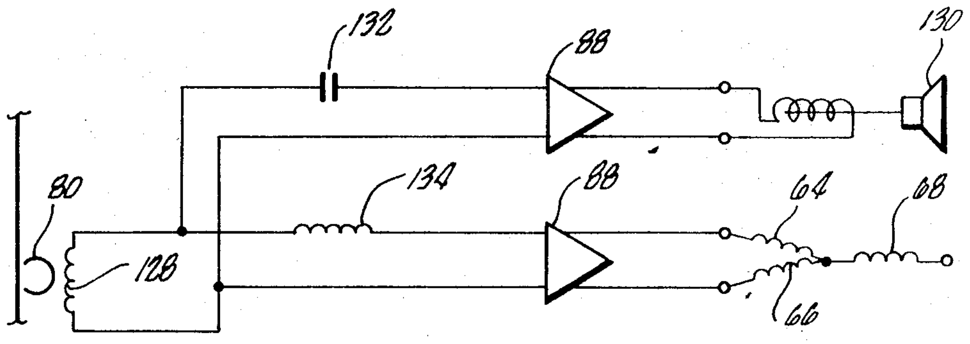
FIG. 5 is a schematic block diagram of another embodiment of a dividing network utilized on the reproduce side of the recording system.

In still another embodiment of the circuitry connected to a transducer on the reproduce side of the apparatus, FIG. 5 illustrates a reproduce head located in operative reproduce relation with recording medium 18. The output coil 128 is connected in common to a conventional electromagnetic speaker 130 to which is transmitted the reproduce high frequency (300—3000 hertz) audio signals through a filtering capacitor 132 and an amplifier 88 and to a pair of synchro stator windings 64, 66 to which is transmitted a portion of the low frequency (60 hertz) reference information through a filtering inductor 134 and another amplifier 88 to provide a portion of the energy for driving the reproduce synchro which in turn drives a display device such as a clock movement.

Among other advantages is that utilizing a system according to the present invention for recording time information provides that even the shortest segment of tape will contain complete time information due to the nature of the signal produced by a self-synchronous motor. Although a system utilizing a self-synchronous motor system has been described, the preceding method of recording and reproducing time information can likewise be accomplished by other systems which utilize recorded phase displacement or other synchro approaches in place of utilizing recorded voltage amplitudes. As in the synchro apparatus which is the subject of the present invention, the separation of time information from intelligence information when utilizing these alternate systems can also be conveniently made on a frequency basis, provided the frequency range of both forms of information to be recorded is confined to the frequency range of the recorded system.

I claim:

1. Apparatus for recording time information simultaneously with intelligence information comprising:
   - a plurality of sources of intelligence information electric signals to be recorded;
   - a source of time information to be recorded;
   - an electric signal source operatively linked to said source of time information at the input side, the signal source having a plurality of individual outputs for generating a plurality of electrical output signals, the combination of said output signals being an electric counterpart of the information from said time information source;
   - a recording medium having a plurality of recording channels;
   - a plurality of recording transducers, each of said transducers being electrically coupled in common to a different one of said plurality of outputs from the signal source and a different one of said plurality of intelligence information signal sources and being located in operative recording relationship with a different channel of said recording medium; and
   - means for moving the recording medium relative to the transducers for recording said intelligence and reference information simultaneously in said plurality of recording channels.

2. Apparatus according to claim 1 including
   - a plurality of electric signal sources, each of said signal sources being operatively linked to a source of a portion of the time information to be recorded, each of said signal source having a plurality of individual outputs for generating a plurality of electrical output signals, the combination of signals from each signal source being an electric counterpart of the particular source of time information connected to the signal source;
   - a plurality of recording transducers, each of said transducers being connected to receive a different one of said second plurality of signals and being located in operative recording relationship with a different channel of said recording medium;
   - means for transmitting the intelligence information signals and the outputs from said signal sources to each of said common recording transducers simultaneously without interference; and
   - means for moving the recording medium relative to the transducers for recording the plurality of intelligence information signals and time information signals in said plurality of recording channels.

3. Apparatus according to claim 2 wherein each of said signal sources is a self-synchronous generator having a rotor winding and three stator windings, the outputs from said generators being taken from said stator windings.

4. Apparatus according to claim 1 including means for reproducing the recorded time information and intelligence information comprising
   - a plurality of reproduce transducers, each of said transducers being located in an operative reproducing relationship with a different channel of the recording medium;
   - means connected to the output of each of the transducers for separating the time information from the intelligence information;
   - an electric signal receiver coupled to the separating means for receiving the time information output signals therefrom, the signal receiver having a plurality of individual inputs for accepting a different signal from each of the transducers, the combination of said signals being an electric counterpart of the time information recorded in the recording medium;
   - means connected to the separating means for receiving each of the intelligence information output signals and for conditioning and presenting each of the intelligence information signals;
   - a time information readout mechanism; and
   - means for operationally linking the output of the electric signal receiver to the time information readout mechanism whereby the recorded time information is presented.

5. Apparatus according to claim 4 including
   - a plurality of electric signal receivers, each of said signal receivers having a plurality of inputs for receiving a signal at each input from the separating means, the combination of signals received at each receiver being an electric counterpart of a portion of the time information recorded on the recording medium;
   - a plurality of time information readout mechanisms each of said mechanisms being connected to a different one of said signal receivers;

a plurality of reproduce transducers, each of said transducers being coupled through the separating means to an intelligence information receiving means and to an input of one of the signal receivers and being located in operative reproducing relationship with a different channel of said recording medium; and means for moving the recording medium relative to the transducers whereby the plurality of intelligence information signals and reference information signals recorded therein are reproduced by said intelligence information output signal presenting means and time information readout mechanisms.

6. Apparatus according to claim 1 wherein the signal source is arranged to generate the time information signals in a cyclically varying manner in a first frequency range; and the intelligence information from the plurality of sources also varies in a cyclical manner in a second frequency range outside of said first range.

7. Apparatus according to claim 6 including means for connecting the apparatus to a source of an cyclically varying electric power signal having a predetermined frequency for energizing the apparatus; and means for connecting said source of power to one of said transducers for recording said energizing power signal on the recording medium.

8. Apparatus for recording rotary mechanical motion simultaneously with information signals related to said rotary mechanical motion comprising:

a source of rotary mechanical motion to be recorded;

a source of information signals related to said rotary mechanical motion;

a rotating electric generator having a rotor, a rotor winding and a plurality of interconnected stator windings, the rotor being mechanically linked to the source of motion to be recorded;

means for deriving an output signal from different pairs of stator windings responsive to motion from the rotary mechanical motion source, the combination of said plurality of signals being an electric analog of said rotary motion;

a recording medium having a plurality of recording channels;

a plurality of recording transducers, each of the transducers being electrically coupled to an output from a different pair of stator windings of the electric generator, the transducers being located in operative recording relation with a different channel of the recording medium at least one of said transducers being coupled in common to one of said plurality of outputs and the information signals source; and means for moving the recording medium relative to the transducers for recording said analog signals and information signals simultaneously in said plurality of recording channels.

9. Apparatus according to claim 8 including a source of electric power;

means for connecting the source of power to the rotor winding of the generator; and a record transducer located in operative recording relation with the recording medium connected to the power source in common with the connection to the generator whereby a reference power signal is recorded in one of the channels of the recording medium.

10. Apparatus according to claim 9 wherein the rotating electric generator is a self-synchronous generator;

the recording medium is a magnetic tape; and the recording transducers are magnetic record heads.

11. Apparatus according to claim 8 including means for reproducing the recorded rotary mechanical motion, and related information signals said means comprising:

a plurality of reproduce transducers, each of the transducers being located in an operative reproduce relation with a different channel of the recording medium;

a rotating electric signal receiver having a rotor, a rotor winding and a plurality of interconnected stator windings, each pair of interconnected stator windings being connected to a different one of the reproduce transducers for providing a plurality of inputs to the signal receiver;

means coupled to one of the reproduce transducers for presenting the recorded information signals;

a device for presenting the recorded rotary mechanical motions mechanically linked to the rotor of the signal receiver for providing an output from the receiver; and means for moving the recording medium relative to the transducers for reproducing the analog signals and information signals whereby the presentation device is actuated to reproduce the recorded mechanical motion.

12. Apparatus according to claim 11 including a power signal reproduce transducer located in operative reproduce relationship with the channel containing said power signal; and means for connecting the reproduced power signal from the associated reproduce transducer to the rotor winding of the signal receiver for providing energizing power for the receiver.

13. Apparatus according to claim 12 wherein the transducers are a plurality of magnetic reproduce heads; and the signal receiver is a self-synchronous motor.

14. Apparatus for combining reference information with intelligence information comprising:

a source of intelligence information electric signals;

a source of reference information;

an electric signal source operatively linked to the source of reference information, the signal source having a plurality of outputs for generating a signal at each output, the combination of said signals being an electric counterpart of the information from said reference information source;

first electric circuit means connected to the source of intelligence information and the signal source for combining the intelligence signals and at least one of the signal source outputs;

second electric circuit means for combining the combined signals and the remaining electric signal source output signals in a number of channels less than the combined total number of outputs from the source of intelligence information and the signal source;

terminal means in operative relationship with the second circuit means for receiving the combined intelligence information signals and signal source output signals;

electric circuit separating means connected to the terminal means for sorting the received signals into a plurality of individual channels;

electric filter means for separating the intelligence information signals from the reference information signals;

means connected to the filter means for reproducing the transmitted intelligence information;

a reference information signal receiver connected to the filter means, the receiver having a plurality of inputs for receiving each of the transmitted signal source output signals;

a display device for reproducing the transmitted reference information; and means operatively linking the electric signal receiver output and the display device for producing a display of the transmitted reference information.

15. Apparatus for combining reference information with intelligence information comprising:

a source of intelligence information electric signals;

a source of reference information;

an electric signal source operatively linked to the source of reference information, the signal source having a plurality of outputs for generating a signal at each output, the combination of said signals being an electric counterpart of the information from said reference information source;

a transmission medium having a plurality of transmission channels;

electric circuit means interconnecting the transmisson channels with the signal source outputs, each of said outputs being associated with a different transmission channel, at least one of said transmission channels being connected in common to said source of intelligence information and at least one of the signal source outputs;

means for transmitting the signals connected to the transmission channels to a remote location;

a signal receiver at said remote location having a plurality of inputs corresponding to the number of channels in the transmission medium;

filter means connected to each of the receiver inputs for separating the intelligence information signals from the reference information signals;

an intelligence information reproducing device connected to the intelligence information output of the filter means;

a reference information signal receiver connected to the filter means, the receiver having a plurality of inputs for receiving each of the transmitted signal source output signals;

a display device for reproducing the transmitted reference information; and means operatively linking the electric signal receiver output and the display device for producing a display of the transmitted reference information.

16. Apparatus for recording and reproducing real time information simultaneously with the recording and reproducing of audio information signals comprising:

a plurality of audio input transducers responsive to voice notations supplied thereto;

a mechanical clock movement for providing a source of real time information;

a record self-synchronous motor having a rotor and rotor winding and three stator windings, the rotor being mechanically linked to the clock movement, each of the stator windings having an output terminal for deriving an output signal, the combination of outputs from the stators being uniquely related to the mechanical position of the clock movement;

a magnetic recording medium having at least four recording channels therein;

at least four magnetic record heads, three of the record heads being connected across a different pair of stator output terminals and being located in operative recording relationship with a different channel of the magnetic recording medium;

means for connecting the output of each of the audio transducers in common with a different one of the outputs from the stator output terminals;

means for energizing the rotor winding of self-synchronous motor from a cyclically varying power source;

circuit means for connecting the power source to the fourth magnetic record head for recording a frequency and phase reference power signal in the fourth recording channel of the magnetic recording medium;

means for moving the recording medium relative to the magnetic record heads for recording the audio and real time information simultaneously in the plurality of recording channels;

at least four magnetic reproduce heads;

means for moving the magnetic recording medium with the recorded audio and real time information past the magnetic reproduce transducers for reproducing electric signals corresponding to the recorded information;

means for separating the audio information from the real time information and for supplying the audio to a plurality of audio output devices;

a reproduce self-synchronous motor having a rotor, a rotor winding and three stator windings, each of the stator windings having an input terminal;

amplifying means interconnecting three of the magnetic reproduce heads with a different pair of stator winding terminals of the reproduce self-synchronous motor for amplifying and transmitting the reproduced electric signal to the reproduce motor interconnecting the fourth magnetic reproduce transducer with the rotor winding of the reproduce self-synchronous motor;

amplifying means for amplifying and transmitting a reproduced frequency and phase reference power signal to the reproduce motor;

a mechanically driven display device for presenting real time information; and means for mechanically linking the rotor of the reproduce self-synchronous motor and the mechanical drive of the display device whereby the real time information recorded on the magnetic medium can be reproduced from the smallest increment of the medium without reference to any other portion of medium.

17. A method of recording time information with intelligence information comprising the steps of:

1. providing a plurality of recording transducers;
2. locating a recording medium having a plurality of recording channels in operative recording relation with the transducers, each of said transducers being located in operative recording relation with a different channel of said recording medium;
3. transmitting signals corresponding to the intelligence information to be recorded to at least one of said transducers;
4. generating a plurality of related time signals responsive to a source of the time information to be recorded, the combination of said time signals being an electric counterpart of the time information to be recorded;
5. transmitting each of the plurality of time signals to a different one of the plurality of transducers; and
6. recording one each of the intelligence information signals and one each of said related time signals simultaneously by means of a different one of said plurality of transducers in a different one of said plurality of transducers in a different one of said plurality of channels on said medium.

18. The method according to claim 17 including reproducing the recorded time and intelligence information comprising the steps of:

1. providing a plurality of reproduce transducers;
2. moving the recording medium relative to the transducers with the plurality of recording channels located in operative reproducing relating with the transducers, each of said transducers being associated with a different channel of the recording medium;
3. simultaneously reproducing the plurality of recorded intelligence information signals and the plurality of related time signals responsive to movement of the recording medium with respect to the reproduce transducers;
4. separating and transmitting each of the plurality of the reproduced intelligence signals to individual intelligence information presentation devices;
5. transmitting a predetermined combination of reproduced time signals to a time information signal receiver;
6. operating the time information signal receiver to produce an output responsive to the reproduced signals transmitted to the receiver; and
7. operating a display device linked to the output of the signal receiver for displaying the reproduced time information.

19. A method according to claim 17 for recording several modes of real time information, for example, seconds, minutes and hours, including the steps of:

1. providing a source of real time information corresponding to each of the modes of real time information to be recorded;
2. connecting each of the sources of real time information to a corresponding number of electric signal generators;

3. providing three outputs from each of said signal generators, the combination of outputs from each signal generator being uniquely related to the time information from the associated source; and 4. recording the combination of output signals from each of said signal generators in different channels of the recording medium.